United States Patent

[11] 3,615,748

[72] Inventor Lawrence A. Smalheiser
 Spring Valley, N.Y.
[21] Appl. No. 781,580
[22] Filed Dec. 5, 1968
[45] Patented Oct. 26, 1971
[73] Assignee Stauffer Chemical Company
 New York, N.Y.

[54] PROCESS FOR PREPARING QUICK DRYING, PLASTICIZED SULFUR ROAD COMPOSITIONS
 12 Claims, No Drawings

[52] U.S. Cl..................................................... 106/19,
 94/1.5, 106/286, 106/287
[51] Int. Cl...................................................... C09d 11/00,
 C09d 13/00
[50] Field of Search............................................. 106/19,
 286, 287 S; 94/1.5; 23/114, 115, 138;
 260/607–609

[56] References Cited
 UNITED STATES PATENTS

| | | | |
|---|---|---|---|
| 2,799,593 | 7/1957 | Seymour et al. ............ | 106/287 S |
| 3,020,252 | 2/1962 | Hancock .................. | 106/19 X |
| 3,342,620 | 9/1967 | Molinet et al. ............ | 106/287 S |
| 3,434,852 | 3/1969 | Louthan ................. | 106/19 |
| 3,437,498 | 4/1969 | Martin ................... | 106/19 |
| 3,421,911 | 1/1969 | Greco et al. .............. | 106/19 |
| 3,333,008 | 7/1967 | Lang et al. ............... | 260/609 |

Primary Examiner—Julius Frome
Assistant Examiner—Joan B. Evans
Attorneys—Donald M. Mackay, Robert C. Sullivan, Paul J. Juettner and Daniel C. Block ABSTRACT: Process for preparing sulfur marking compositions comprising from about 50 percent to about 95 percent elemental sulfur, from about 1 percent to about 20 percent sulfur containing plasticizer and from about 0 percent to about 30 percent filler, comprising reacting said ingredients in the presence of a basic catalyst, the improvement which comprises incorporating in said reaction mixture a minor amount of a nitrogen containing compound as drying agent selected from mercaptobenzothiazoles, mercaptoalkylthiazoles, dithiocarbamates, bis(thiocarbamoyl) sulfides, guanidines and aldehyde-amine reaction products.

PROCESS FOR PREPARING QUICK DRYING, PLASTICIZED SULFUR ROAD COMPOSITIONS

This invention relates to road-marking compositions comprising sulfur and a sulfur-containing plasticizer, which have improved drying characteristics, and to a process for preparing these novel compositions.

Although a variety of paints have heretofore been used for marking roads, parking lots, airport runways, and the like, the limited durability of these paints has initiated considerable research for other surface coating compositions. For example, compositions containing a major amount of sulfur have been recently proposed for use in various marking applications by reason of their low cost, resistance to water, oils and the like, and also for such reasons as their increased impact resistance. Generally, these compositions contain from about 50 to about 95 parts elemental sulfur by weight of the composition excluding fillers, pigments, viscosity reducing compounds, plasticizers, and the like. One of the difficulties encountered with many sulfur road-marking compositions, however, is that the compositions require approximately 15 minutes or more to dry after being applied to the road surface. While these drying times are less than those required for the commonly employed paints, the provision of a quick-drying composition would obviate the need for markers and the accompanying labor cost required for laying the markers to protect the stripes from traffic until the stripes are dry and also the labor cost of removing the markers. Accordingly, an inexpensive fast-drying sulfur composition would be more able to compete with the less inexpensive paints which, for the most part, now have the bulk of the market.

It has now been discovered that quick-drying plasticized sulfur compositions can be prepared by incorporating with the plasticizer and elemental sulfur a minor amount of a nitrogen-containing compound as drying agent. Exemplary of nitrogen-containing compounds which serve as drying agents are mercaptobenzothiazoles, mercaptoalkylthiazoles, dithiocarbamates, bis (thiocarbamoyl) sulfides, guanidines, and aldehyde-amine reaction products such as hexamethylene tetraamine. The mercaptobenzothiazoles can be represented by;

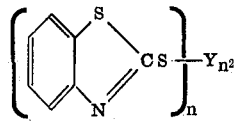

wherein Y is hydrogen, a heavy metal or relatively inert radical comprised of derivatives containing hydrocarbon, nitrogen-containing moieties, and ketone substituents; n is an integer of from 1 to 2 inclusive, and $n^2$ is an integer of from 0 to 1 inclusive. Examples of suitable mercaptobenzothiazoles including: 2-mercaptobenzothiazole; 1,3-bis (2-benzothiazolyl-thiomethyl)-urea, $S.C_6H_4 . SCH_2NH)^2CO$; 2-(2,4-dinitrophenylthio), benzothiazole $(S.C_6n_4.N:C.SC_6H_3(NO_2)_2)$; zinc, lead, copper tellurium and selenium salts of 2-mercaptobenzothiazole; 2-benzothiazolyl N,N-diethylthiocarbamoyl sulfide, $(S.C_6H_C) N:C.S-CSN(C_2H_5)_2$; N,N-oxydiethylene-2-benzothiazole and sulfenamide (2-morpholinothiobenzethiazole), $(S.C_6H_4.N:C.SN.C_2H_4O.C_2H_4)$; 2,2'-dithiobisbenzothiazole, $(S.C_6H_4.N:C.)_2S_2$; N-cyclohexyl-2-benzothiazolesulfenamide $(S.C_6H_4.N:C.SNHC_6H_{11}2$-sulfenamide; and N-tert-butyl-2-benzothiazolesulfenamide.

The mercaptoalkylthiazoles can be represented by the formulae:

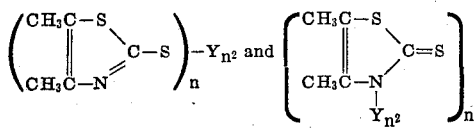

wherein Y, n and $n^2$ are as previously defined. Examples of suitable mercaptoalkylthiazoles include the following compounds wherein

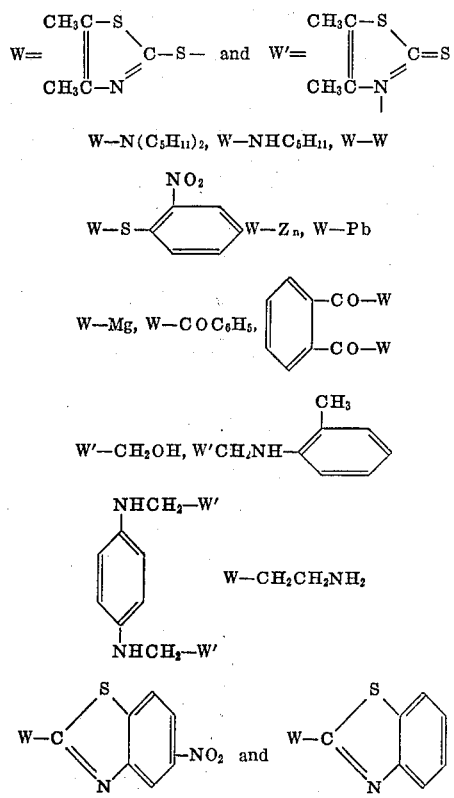

The dithiocarbamates can be represented by the formula:

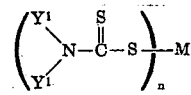

wherein the groups represented by $Y^1$ are alkyl of from one to four carbon atoms inclusive, benzyl or are taken together to form a saturated ring; M is a heavy metal and n is as previously defined. Examples of suitable dithiocarbamates include: zinc diethyldithiocarbamate, zinc dimethyldithiocarbamate, zinc dibenzyldithiocarbamate, bismuth dimethyldithiocarbamate, nickel dibutyldithiocarbamate, copper dimethyldithiocarbamate, selenium diethyldithiocarbamate, lead dimethyldithiocarbamate, selenium dimethyldithiocarbamate, tellurium diethyldithiocarbamate, and zinc pentamethylenedithiocarbamate.

The bis(thiocarbamoyl) sulfides also known as thiuram sulfides, can be represented by the formula:

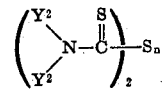

wherein the groups represented by $Y^2$ are alkyl of from one to four carbon atoms inclusive or are taken together to form a saturated ring, and n is as previously defined. Examples of suitable bis(thiocarbamoyl) sulfides include: bis(dimethylthiocarbamoyl) disulfide, bis(dimethylthiocarbamoyl)sulfide, bis(diethylthiocarbamoyl)disulfide, bis(di-n-butylthiocarbamoyl)disulfide, and bis(dibutylthiocarbamoyl)sulfide.

The guanidines which can be employed are: 1,3-diphenylguanidine, and 1,3-di-o-tolylguanidine.

The aldehyde-amine reaction products which can be employed are the products prepared from reacting aldehydes of from one to seven carbon atoms with secondary amines of from one to ten carbon atoms or ammonia. Examples of suitable aldehyde-amine reaction products include the reaction products of: butyraldehyde and butylideneaniline; butyraldehyde acetaldehyde and aniline; formaldehyde and paratoluidine; butyraldehyde and aniline; butyraldehyde and butylamine; ammonia and acetaldehyde; heptaldehyde and aniline; formaldehyde and ammonia, and ethyl chloride, formaldehyde and ammonia.

The preferred drying agents are the metal dithiocarbamates as exemplified by zinc diethyl dithiocarbamate, and zinc dimethyldithiocarbamate; the bis(thiocarbamoyl) sulfides as exemplified by bis(dimethylthiocarbamoyl) sulfide and bis(dimethylthiocarbamoyl) disulfide; and the mercaptobenzothiazoles as exemplified by 2-mercaptobenzothiazole. With the preferred drying agents, generally superior results are produced and these drying agents are more readily available.

The compositions of this invention comprise essentially a major amount of elemental sulfur, a minor amount of sulfur-containing plasticizer and a minor amount of nitrogen-containing compound as drying agent.

Among the plasticizers which can be employed in this invention are the polysulfide plasticizers wherein the bridging links between adjacent sulfur atoms in the polymer chain include an aromatic radical and/or an aliphatic radical to include aliphatic either linkages. Typical of these plasticizers are styrene polysulfide which has the repeating unit -$C_2H_3C_6H_5S_{16}$— and is available as Thiokol polymer ZM-399. Another polysulfide plasticizer in this group is one having the repeating unit -$CH_2$-$C_6H_4$-$CH_2$-$S_x$-wherein $x$ is an integer of from 2 to 16.

The aliphatic polysulfides containing either linkages are exemplified by Thiokol LP3 which has the recurring unit -$S_xCH_2ChOCH_2OCH_2CH_2S_x$—wherein $x$ has a value of 4 and the polymer has a molecular weight of about 1,000. U.S. Pat. No. 2,402,977, issued July 2, 1946 to Patrick et al. describes in detail the manner of forming the organic polysulfide polymers of interest to the present invention and the ingredients involved in the formation thereof.

Other plasticizers which can be utilized in this invention are the dimercaptans of the general formula HS-$(A)_n$-SH wherein A is selected from the group consisting of two to 10 carbon alkylene and chalcogen interrupted alkylene having from two to 10 carbon atoms, and $n$ is an integer of from 1 to 2. Exemplary of suitable chalcogens are oxygen and sulfur. Illustrative of suitable plasticizers encompassed by the above formula are $\beta\beta'$-dimercaptodiethyl ether, triethylene glycol dimercaptan, 1,6-hexane dimercaptan, 1,10-decane dimercaptan, 1,3-propane dimercaptan, ethylene glycol bis(thioglycolate), and ethylene glycol bis(mercaptopropionate).

Other suitable plasticizers which can be employed are represented by the formula R-S-R wherein the groups represented by R are secondary amines. Examples of suitable secondary amines for the purposes of this invention include: aliphatic amines such as dimethylamine, ethyl methylamine, diethylamine, diisopropylamine, dibutylamine, dipentylamine, and didodecylamine; alicyclic amines such as dicyclohexylamine and dicyclopropylamine; aromatic amines such as diphenylamine, N-phenyl-1-naphthylamine, N-phenyl-2-naphthylamine, N-methylphenylamine, N-ethylphenylamine; and heterocyclic amines such as ethyleneamine, hexamethyleneamine, morpholine, piperidine, tetrahydroquinoline, tetrahydropyrrole, 1,2,3-dioxazine, p-isoxazine, and indole.

These plasticizers are prepared by reacting the desired amine with a sulfur halide in a molar ratio of at least 2:1. An inert organic solvent is employed and the reaction is conducted in the presence of an alkaline material, such as sodium carbonate, at a temperature below about 30° C.

Other suitable plasticizers are prepared by reacting a polymercaptan with a compound containing an episulfide group. The polymercaptans which can be utilized are represented by the formula:

HS-R-$(SH)_n$

Wherein R is a hydrocarbon containing up to and including 20 carbon atoms per molecule and $n$ is an integer of from 1 to 2 inclusive. Illustrative of the hydrocarbon radicals as represented by R' above are cyclic and acyclic aliphatic, aryl, and alkaryl. Representative example of suitable polymercaptans that can be employed include cyclo-aliphatic compounds, such as dimercaptocyclohexane, dimercaptocyclopentane, dimercaptomethylcyclohexane, dimercaptoethylcyclohexane, dimercaptoalphaterpinene, dipentene dimercaptan, dimercaptodicyclopentadiene, dimercaptodi(methylcyclopentane), trimercaptocyclododecane, and dimercaptocyclooctane. Representative examples of suitable acyclic aliphatic polymercaptans include dimercaptoethane, dimercaptopropane, dimercaptobutane, dimercaptodiethylether, dimercaptotriethyleneglycol, dimercaptohexane, dimercaptodecane, ethyleneglycol bis (thioglycolate), and ethyleneglycol bis (mercapto propionate). Representative examples of suitable aryl polymercaptans include dimercaptobenzene, dimercaptonaphthalene and anthracenedimercaptan. Representative examples of suitable alkaryl polymercaptans include dimercaptomethylbenzene dimercaptoethylbenzene, dimercaptostyrene, dimercapto isopropylbenzene, dimercaptoxylene, dimercaptotoluene and p-dimercapto diethylbenzene. Preferred polymercaptans are those having a mercapto ethyl or propyl substituent, such as dimercaptoethylcyclohexane, dimercaptoisopropyl cyclohexane, dipentendimercaptan, dimercaptoethylbenzene, dimercaptoisopropylbenzene, dimercaptoethyltoluene and the like.

Representative examples of suitable compounds containing an episulfide group include ethylene sulfide, propylene sulfide, 1-butene sulfide and cyclohexene sulfide. These plasticizers are prepared by reacting the polymercaptan with the episulfide in a molar ratio of at least about 1 mole of episulfide per mole of mercapto group in the polymercaptan in the presence of an acidic catalyst such as boron trifluoride. The reaction is conducted for between about 10 and about 20 hours at a temperature between about 0° C. and 100° C. Other plasticizers which can be employed are represented by the general formula:

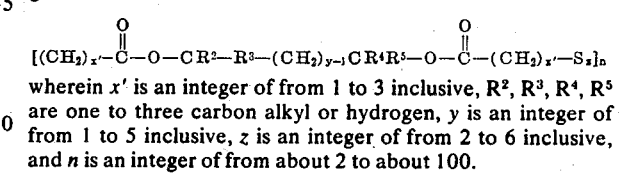

wherein $x'$ is an integer of from 1 to 3 inclusive, $R^2$, $R^3$, $R^4$, $R^5$ are one to three carbon alkyl or hydrogen, $y$ is an integer of from 1 to 5 inclusive, $z$ is an integer of from 2 to 6 inclusive, and $n$ is an integer of from about 2 to about 100.

These plasticizers are prepared by the interfacial polycondensation of a dihalo-substituted diacylated glycol with an aqueous sodium polysulfide solution. A freshly precipitated magnesium hydroxide dispersion is used as a nucleating agent, and if desired, a dispersing agent of the alkyl-aryl sulfonate type. The polysulfide is then recovered from the dispersion by acidification to a pH between 4 and 5 which causes the dispersion to coagulate as a rubbery material.

Some representative examples of dihalides which may be utilized in the reaction include the following: ethylene bis (chloroacetate, ethylene bis(3-chloropropionate), ethylene bis(4-chlorobutyrate), 1,2-propane bis(chloroacetate), 1,3-propane bis(chloroacetate), and 2-methyl-2,4-pentane bis (chloroactate).

Examples of suitable polysulfides for reaction with the dihalide include: sodium disulfide, sodium trisulfide, sodium tetrasulfide and sodium pentasulfide.

Examples of suitable plasticizers within the formula include: ethylene diacetate tetrasulfide, 1,2-propane diacetate tetrasulfide, and 2-methyl-2,4-pentane diacetate disulfide.

Other suitable plasticizers include: dialkenyl polysulfide plasticizers which are prepared by the condensation of an alkenyl halide with an aqueous sodium polysulfide solution in a molar ratio of alkenyl halide to polysulfide of 2:1. Representative examples include: diallyl tetrasulfide and diallyl disulfide.

Other additives such as viscosity reducing compounds can also be employed. Illustrative of the viscosity reducing compounds are those compounds having a single reactive site to include:

a. monomercaptans of the formula:

RSH wherein R is selected from halogen substituted and unsubstituted aryl and alkyl and hydroxyalkyl of from two 20 carbon atoms inclusive;

b. monobasic acid monomercaptans of the formula:

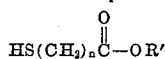

wherein $n$ is in integer of from 1 to 3 inclusive, and $R'$ is selected from hydrogen, sodium, potassium, ammonium, and alkyl, and hydroxyalkyl of from one to 20 carbon atoms inclusive;

c. polysulfides of the unit:

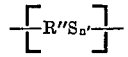

wherein $R''$ is selected from phenyl and aralkyl and alkyl of from two to 10 carbon atoms inclusive, and $n'$ is an integer greater than 1, and d. styrene.

Representative examples of viscosity reducing chain terminating compounds include: thiol acids such as thiobenzoic acid, thioacetic acid, thiolauric acid and thiopalmitic acid; alkyl mercapto-alcohols such as mercaptoethanol, mercaptopropanol, mercaptobutanol, mercaptopentanol, mercaptohexanol, mercaptoheptanol, mercapto-octanol, mercaptodecanol, mercaptododecanol and mercaptohexadecanol; alkaryl mercaptans such as thiocresol; substituted aryl mercaptans such as parachlorothiophenol; monobasic acid monomercaptans and their alkali metal and ammonium salts such as mercaptoacetic acid, mercaptopropionic acid, ammonium thioglycolate, potassium thioglycolate and sodium thioglycolate; monobasic acid ester monomercaptans such as t-butyl mercaptoacetate iso-octyl mercaptoacetate, iso-octyl mercaptopropionate and octadecyl mercaptopropionate; hydroxyalkyl esters of monobasic acid monomercaptans such as hydroxyethyl mercaptoacetate and hydroxyethyl mercaptopropionate; alkyl polysulfides such as diethyl trisulfide, diethyl disulfide, dipropyltetrasulfide, dihexyl disulfide and didecyl disulfide; aromatic polysulfides such as diphenyl disulfide; aralkyl polysulfides such as dibenzyl disulfide, dibenzyl trisulfide and dibenzyl tetrasulfide; and olefinically unsaturated compounds such as styrene.

Preferred however, are the aliphatic monomercaptan monobasic acid esters, such as iso-octyl mercaptoacetate, the aliphatic mercapto;alcohols, such as mercaptoethanol, the alkaryl mercaptans such as thiocresol, and the chlorosubstituted aryl mercaptans such as parachlorothiophenol. These preferred viscosity reducing compounds are effective at much lower concentrations than some of the other compounds such as the alkyl mercaptans. If used, generally a minor amount of from about 0.05% percent to about 10 percent of viscosity reducing compound is sufficient, and preferably from about 0.2 percent to about 5 percent is used.

Generally, a minor amount of drying agent will be sufficient such as from about 0.05 percent to about 10 percent and preferably from about 0.1 percent to about 2 percent. The plasticizer can be present in an amount from about 1 percent to about 20 percent but generally from about 5 percent to about 10 percent will be sufficient. The quantity of elemental sulfur should be at least about 50 percent, however, the amount of elemental sulfur may be as great as 95 percent by weight of the total composition, and yet the composition is quick drying. The filler, if present, can constitute up to about 30 percent of the composition.

The compositions can be prepared by dry-mixing the ingredients prior to heating or by adding the filler, additives, drying agent and plasticizer to the molten sulfur. For best results, however, in order to avoid the decomposition of the drying agent and other additives, the following order of addition is employed. First, the plasticizer is added to the molten sulfur while the sulfur is maintained at a temperature between about 118° C. and about 149° C. The mixture is then heated to a temperature between about 163° C. and about 188° C. and maintained at this temperature for at least about 15 minutes.

The reaction mixture is then allowed to cool to a temperature of about 135° C. wherein the pigments and other fillers are added which causes the temperature of the reaction mixture to recede to about 121° C. The drying agent is then added to the reaction mixture at this temperature and the compositions are ready for use as road marking compositions.

The compositions can be applied to any paved surface by conventional means such as, for example, by an applicator of the type used for applying paint which has been adapted to permit maintaining the temperature of the composition at about 140° C.

The following examples will serve to illustrate the invention and its preferred embodiments. All parts and percentages in said examples are on a weight basis.

EXAMPLE 1

In a 4-liter metal container, the following materials are dry-mixed: 72.9 parts elemental sulfur, 6.0 parts $\beta, \beta'$-dimercaptodiethyl ether plasticizer, 20 parts titanium dioxide pigment, 200 parts per million toner, 0.6 parts 2-mercapto-ethanol viscosity reducer, 0.5 parts hydrated silica and 0.5 parts bis(dimethylthiocarbamoyl) monosulfide drying agent. The mixture is heated for 2 hours at 150° C. and then heated for 1 hour at 175° C. The mixture is then sprayed while at a temperature of 150° C. to a paved surface with a flat spray tip having a 0.072 inch orifice diameter and spray angle at 40 p.s.i. of 65°. The strip which is 2-½ inches wide and has a thickness of 54 mils dries in approximately 1-½ minutes.

EXAMPLE 2

In accordance with the procedure of example 1, an identical composition is prepared with the exception that the bis(dimethylthiocarbamoyl) monosulfide drying agent is omitted. The composition when sprayed on a road surface requires 6 minutes to dry.

EXAMPLE 3

In accordance with the procedure of example 1, a composition is prepared and sprayed which differs from the composition of example 1 in that 0.5 parts of zinc dimethyldithiocarbamate is substituted for the drying agent of example 1. The composition, when sprayed on a paved surface with a width of 3-½ inches and a thickness of 30 mils, dries in three-quarters of 1 minute.

EXAMPLE 4

In accordance with the procedure of example 1, a composition is prepared and sprayed which differs only in that the drying agent is the zinc salt of 2-mercaptobenzothiazole. The composition when sprayed as a 3-inch wide strip with a thickness of 28 mils is found to dry in three-quarters of 1 minute.

EXAMPLE 5

In accordance with the procedure of example 1, a composition is prepared and sprayed having the following ingredients: 69.4 parts sulfur, 10 parts triethylene glycol tetrasulfide plasticizer, 20 parts titanium dioxide, 350 parts per million toner, 0.6 parts 2-mercaptoethanol viscosity reducer, and 0.5 parts zinc dimethyldithiocarbamate drying agent. The composition, when sprayed as a four inch wide strip with a thickness of 23 mils, dried in three-quarters of 1 minute.

EXAMPLE 6

In accordance with the procedure of example 1, six compositions are prepared each employing one of the following drying agents: 2,2-dithiobis (4,5-dimethylbenzothiazole), 1,3-diphenylguanidine, zinc diethyldithiocarbamate, bis(dimethylthiocarbamoyl) disulfide, zinc salt of 2-mercaptobenzothiazole, and the reaction product of butyraldehyde, acetaldehyde and aniline. When applied as stripes to a road surface, the drying times correspond to the previous examples.

Although the drying time is dependent upon the percentage of pigment in the composition, the plasticizer employed and the drying agent employed, the compositions of the invention will have considerably shorter drying times than similar compositions having no drying agent.

What is claimed is:

1. In a process for preparing sulfur marking compositions comprising from about 15 percent to about 95 percent elemental sulfur, from about 1 percent to about 20 percent sulfur containing plasticizer and from about 0 percent to about 30 percent filler, comprising reacting said ingredients, the improvement which comprises incorporating in said reaction mixture a minor amount of a nitrogen containing compound as a drying agent selected from the group consisting of mercaptobenzothiazoles, mercaptoalkylthiazoles, dithiocarbamates, bis(thiocarbamoyl)sulfides, and guanidines.

2. The process of claim 1, wherein the drying agent is a mercaptobenzothiazole of the formula

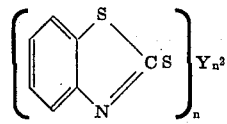

wherein Y is hydrogen, a heavy metal or relatively inert radical comprised of derivatives containing hydrocarbon, nitrogen moieties and ketone substituents; $n$ is an integer of from 1 to 2 inclusive, and $n^2$ is an integer of from 0 to 1 inclusive.

3. The process of claim 1, wherein the drying agent is a dithiocarbamate of the formula wherein the groups represented by $Y^1$ are alkyl of from 1 to 4 carbon atoms inclusive, benzyl or are taken together to form a saturated ring; M is a heavy metal and $n$ is an integer of from 1 to 2 inclusive.

4. The process of claim 1, wherein the drying agent is a bis(thiocarbamoyl) sulfide of the formula wherein the groups represented by $Y^2$ are alkyl of from one to four carbon atoms inclusive or are taken together to form a saturated ring, and $n$ is an integer of from 1 to 2 inclusive.

5. The process of claim 1 wherein the drying agent is bis(dimethylthiocarbamoyl) monosulfide.

6. The process of claim 1, wherein the drying agent is zinc dimethyldithiocarbamate.

7. The process of claim 1 wherein the drying agent is 2-mercaptobenzothiazole.

8. The process of claim 1 wherein the drying agent is 2,2-dithiobis (4,5-dimethylbenzothiazole).

9. The process of claim 1 wherein the drying agent is 1,3-diphenylguanidine.

10. The process of claim 1 wherein the drying agent is zinc diethyldithiocarbamate.

11. The process of claim 1 wherein the drying agent is bis(dimethylthiocarbamoyl) disulfide.

12. The process of claim 1 wherein the drying agent is zinc salt of 2-mercaptobenzothiazole.

* * * * *

PO-1050
(5/69)

UNITED STATES PATENT OFFICE
CERTIFICATE OF CORRECTION

Patent No. 3,615,748        Dated October 26, 1971

Inventor(x)    Lawrence A. Smalheiser

It is certified that error appears in the above-identified patent and that said Letters Patent are hereby corrected as shown below:

Column 1, line 40, delete the semicolon after the word "by" and insert --the formula;-- ; line 53, delete the word "including" and in its place insert the word --include--; line 54, delete "S.C.$_6$H$_4$ . SCH$_2$NH)$^2$CO;" and in its place insert --(S.C$_6$H$_4$.N:C.SCH$_2$NH)$_2$CO;-- ; line 55 and 56 delete "(S.C$_6$n$_4$.N:C.SC$_6$H$_3$(NO$_2$)$_2$;" and in its place insert --(S.C$_6$H$_4$.N:C.SC$_6$HC(NO$_2$)$_2$;-- ; line 58, delete "(S.C.$_6$H$_c$)N:C.S-CSN(C$_2$H$_5$)$_2$;" and in its place insert --(S.C$_6$H$_4$.N:C.S-CSN(C$_2$H$_5$)$_2$;-- ; line 60, delete "linothiobenzethiazole)" and in its place insert --linothiobenzothiazole)-- ; line 60, delete"(S.C.$_6$H$_4$.N:C.SN.C$_2$H$_4$O.C$_2$H$_4$)" and in its place insert --(S.C$_6$H$_4$.N:C.SN.C$_2$H$_4$O.C$_2$H$_4$)-- ; line 61 delete "(S.C$_6$H$_4$.N:C.)$_2$S$_2$" and in its place insert --(S.C$_6$H$_4$.N:C)$_2$S$_2$--; lines 62, 63 and 64, delete all words after the word "benzothiazolesulfenamide" and add --(S.C$_6$H$_4$.N:C.SNHC$_6$H$_{11}$); N,N-diisopropylbenzothiazole-2-sulfenamide; and N-tert-butyl-2-benzothiazolesulfenamide.-- .

Column 2, line 52, after the word "bis(thiocarbamoyl" insert -- ) -- .

Column 3, line 28, delete the word "either" and insert the word --ether--; line 29, after the word "unit" delete the hyphen; line 30, delete "-S$_x$CH$_2$ChOCH$_2$OCH$_2$CH$_2$S$_x$-" and insert -- -S$_x$CH$_2$CH$_2$OCH$_2$OCH$_2$CH$_2$S$_x$- --; line 43, after the first "β" insert a comma.

Column 4, line 53, after the word "(chloroacetate" insert a parenthesis.

Column 5, line 1, delete the words "two 20" and insert in its place --2 to 20-- ; line 45, after the word "mercapto" delete the semicolor and in its place insert a hyphen; line 52, delete "0.05% percent" and in its place insert --.05%-- ; line 55, delete "0.05 percent" and in its place insert -- .05%-- ;

Column 6, Example 1, line 27, delete "0.072" and in its place insert -- .072 -- .

UNITED STATES PATENT OFFICE
CERTIFICATE OF CORRECTION

Patent No. 3,615,748    Dated  October 26, 1971

Inventor(s)   Larence A. Smalheiser         PAGE - 2

It is certified that error appears in the above-identified patent and that said Letters Patent are hereby corrected as shown below:

Column 8, Claim 3, line 2, after the word "formula" insert the folowing formula

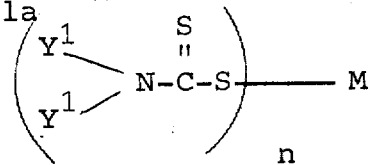

Column 8, Claim 4, line 7, after the word "formula" insert the following formula

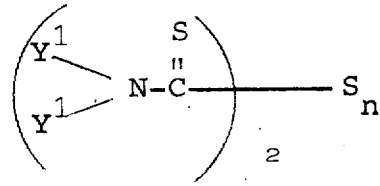

Signed and sealed this 25th day of April 1972.

(SEAL)
Attest:

EDWARD M. FLETCHER, JR.
Attesting Officer

ROBERT GOTTSCHALK
Commissioner of Patents